E. R. ROYSTON.
MELTING AND PURIFYING OF SALT AND OTHER SUBSTANCES.
APPLICATION FILED JUNE 14, 1909.
997,857.
Patented July 11, 1911.
5 SHEETS—SHEET 1.
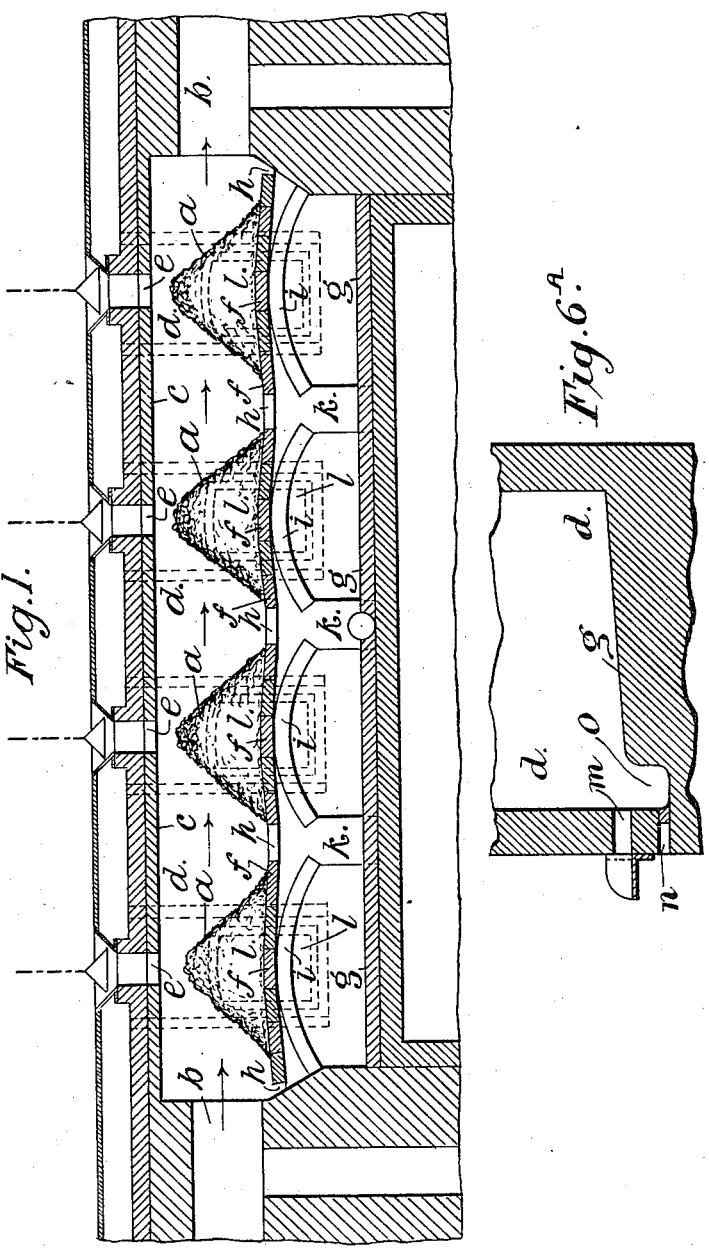
WITNESSES
INVENTOR E. R. ROYSTON.
MELTING AND PURIFYING OF SALT AND OTHER SUBSTANCES.
APPLICATION FILED JUNE 14, 1909.
997,857.
Patented July 11, 1911.
5 SHEETS—SHEET 2.
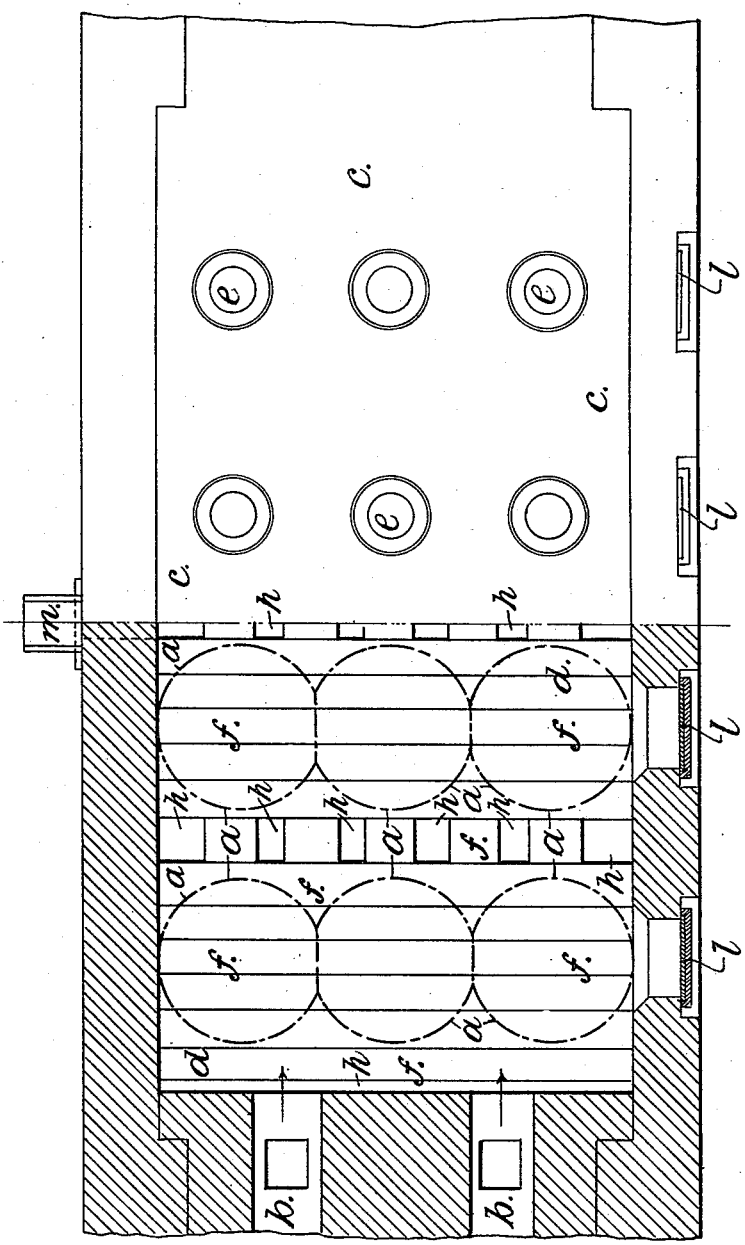
WITNESSES
W. P. Burke
John A. Percival
INVENTOR
Ernest Richard Royston
BY Wm Wallace White
ATTY.

E. R. ROYSTON.
MELTING AND PURIFYING OF SALT AND OTHER SUBSTANCES.
APPLICATION FILED JUNE 14, 1909.
997,857.
Patented July 11, 1911.
5 SHEETS—SHEET 3.
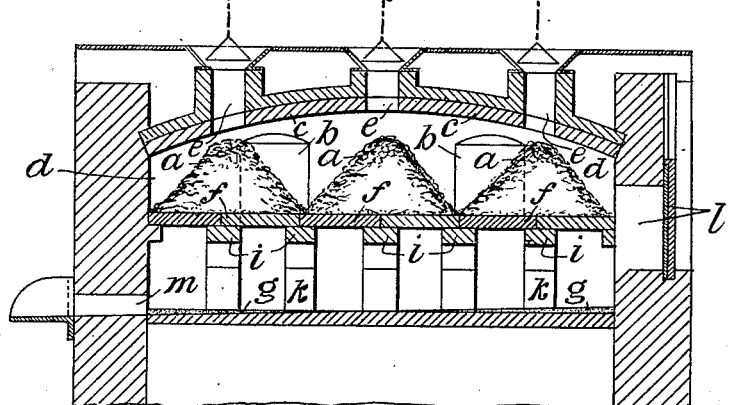
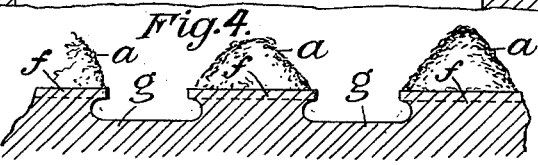
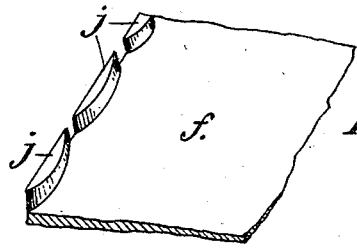
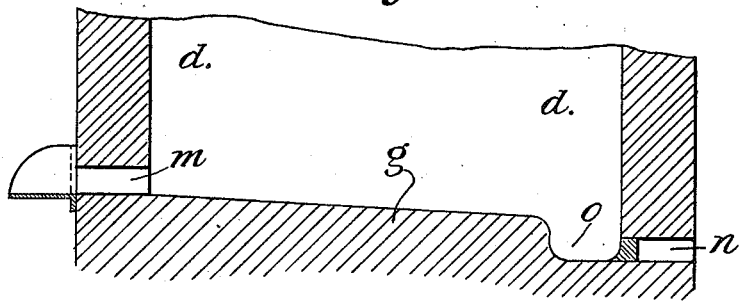
WITNESSES
W. P. Burke
John A. Percival
INVENTOR
Ernest Richard Royston
BY Wm Wallace White
ATTY.

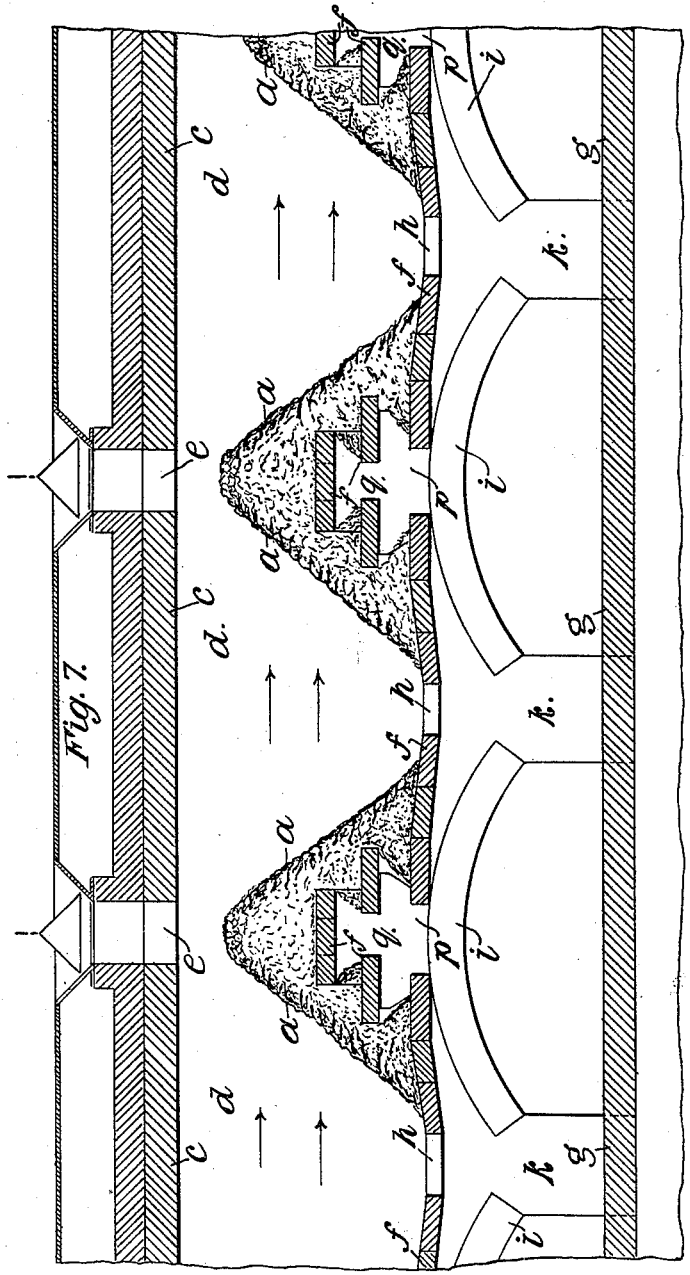

E. R. ROYSTON.
MELTING AND PURIFYING OF SALT AND OTHER SUBSTANCES.
APPLICATION FILED JUNE 14, 1909.
997,857.
Patented July 11, 1911.
5 SHEETS—SHEET 5.
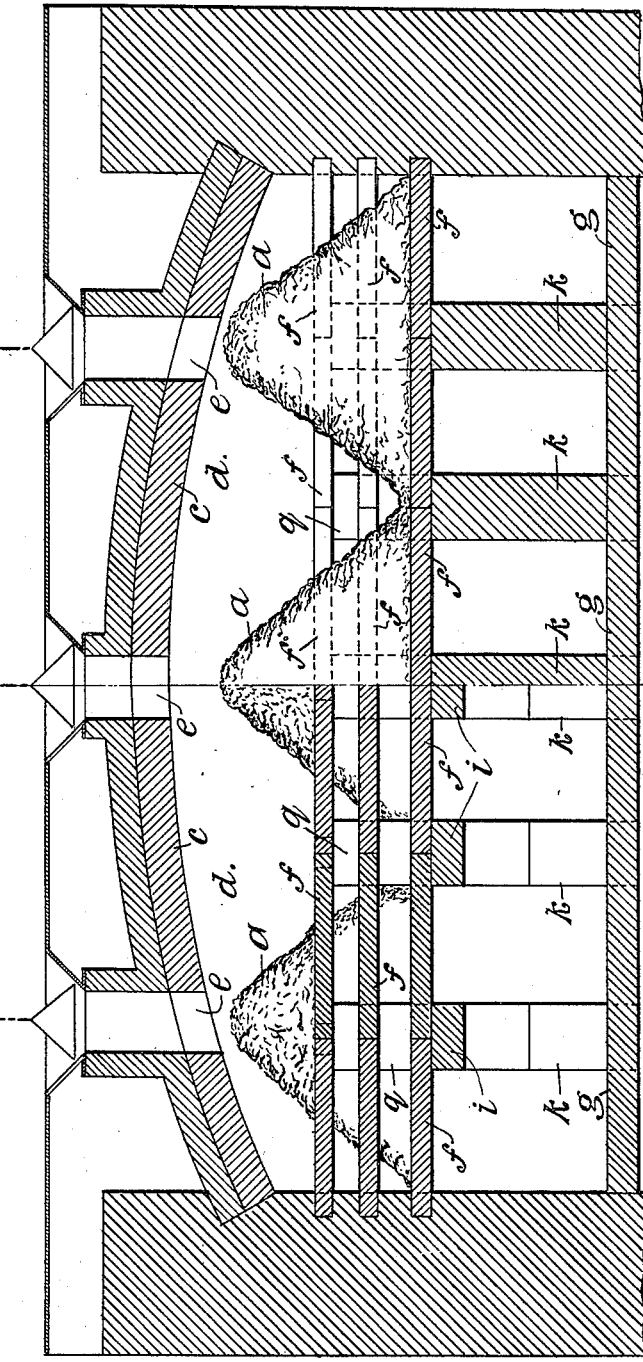
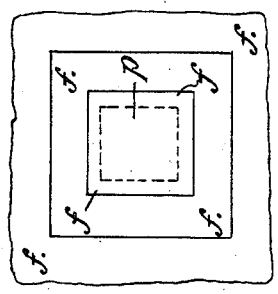
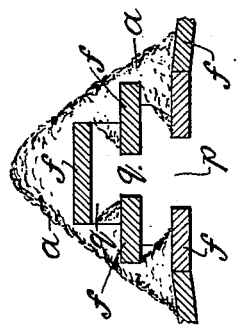
WITNESSES
W. P. Burk
John A. Percival
INVENTOR
Ernest Richard Royston
BY Wm Wallace White
ATTY.

UNITED STATES PATENT OFFICE.

ERNEST R. ROYSTON, OF LIVERPOOL, ENGLAND, ASSIGNOR TO INTERNATIONAL SALT COMPANY LIMITED, OF LONDON, ENGLAND.

MELTING AND PURIFYING OF SALT AND OTHER SUBSTANCES.

997,857. Specification of Letters Patent. Patented July 11, 1911.

Original application filed May 19, 1908, Serial No. 433,793. Divided and this application filed June 14, 1909. Serial No. 502,055.

*To all whom it may concern:*

Be it known that I, ERNEST RICHARD ROYSTON, a subject of the King of England, residing at Liverpool, in the county of Lancaster, England, have invented certain new and useful Improvements in the Melting and Purifying of Salt and other Substances, of which the following is a specification, reference being had therein to the accompanying drawing.

This invention has reference primarily to the production or manufacture of pure white salt (chlorid of sodium) from impure and discolored rock and other salt by the fusion process; and it has for some of its objects and effects, to provide improvements in connection with apparatus by which the melting may be rendered rapid, the consumption of fuel small, and high liquidity in the molten salt may be obtained.

In the following description of apparatus for melting salt, the invention hereunder is comprised; and it is illustrated in the annexed drawings, in which—

Figure 1 is a longitudinal section through a furnace hereunder; Fig. 2 is a plan, half in section of same; and Fig. 3 is a cross section of same. Figs. 4, 5, 6 and 6$^A$, are detail views showing modifications of parts of the furnace. Fig. 7 is a longitudinal section; and Fig. 8 is a cross section showing the arrangement in which the supporting surfaces for the salt are in the form of trays or shelves. Figs. 9 and 10 are elevation and plan showing modifications of the arrangement illustrated in Figs. 7 and 8.

The salt to be melted is supplied at a plurality of points on to a surface within the furnace, in such a manner as to form it into a plurality of piles, so that there will be several rows of piles, and they will occupy practically the whole horizontal area of the furnace; and the melting gases are introduced and passed at their initial or maximum temperatures directly on to the outside surfaces of said piles. In some cases, however, the piles are, by the construction hereinafter described, more or less hollow, and the gases not only act, first, on the outside surfaces of said piles, but also on the interior of same. Furthermore, under the invention, the surface on which the salt is melted is so arranged that it stands above the melted salt, which runs away as melted; the melting gases being passed over the outer surface of the salt without having to pass through the salt.

The furnace—which will be of the reverberatory type—has a platform, table, or shelves, on to which the salt is introduced, and which is disposed over the bottom of the furnace chamber; and the bottom of the furnace chamber, beneath the platform, table or shelves, serves as a receiving and holding bath or vessel for the molten salt; and in this furnace, the platform, table, or shelves, or the lower portion of same, protects the molten salt which collects beneath same from the excessive heating by the hot gases, which are first introduced on to the salt above.

Further characteristics of the invention will be described in the description of the various figures of the drawings.

By the improvements, while the melting of the salt is rapid, and the consumption of fuel small, the salt on the bottom or bed of the furnace will be brought to and kept in a highly liquid state. Furthermore, by the improved type of furnace herein described, the complete operation of melting is rapidly effected without raking, or the like, or any hand labor; and the salt may be fed into the furnace mechanically in any suitable known way.

Referring to Fig. 1, the salt is supplied and subjected to heat in a plurality of piles $a$, the exteriors of which are acted upon directly by the heating gases, supplied above the surface on which these piles rest, through ports $b$ in the walls of the furnace chamber $d$; the salt being introduced into the furnace chamber $d$ through openings $e$ in the roof $c$, and practically all over the whole of the horizontal area of the furnace. By this manner of heating and melting salt, the rate of melting within a given time is rendered very high, while the consumption of fuel is relatively low.

In Figs. 1 to 3, the piles $a$ are supplied over the whole area of, and supported upon a horizontal platform $f$, raised above the bottom $g$ of the furnace, to which the molten salt from the bottom $f$ runs directly as it melts, through apertures $h$. The platforms $f$ are supported from the bottom $g$ by arches $i$, carried by columns $k$; the arches running lengthwise of the furnace in the case shown, and pitched apart at suitable distances. The melted salt may collect on the hearth $g$ directly beneath the platform $f$, and is there shielded by it, and out of the direct current of heat, and so volatilization of the molten salt, which takes place at the temperature of melting, is prevented. At the same time, the salt as it leaves the platforms $f$ is in a highly fluid state, and is maintained in this state until tapped. By maintaining the molten salt in a condition of high fluidity as described, plenty of time is afforded for subsequent operations upon it before the fluidity of the salt is materially reduced.

In the modified arrangement shown in Fig. 4, the platforms or surfaces $f$ on which the salt rests, are solid raised parts, and the molten salt which runs from the piles upon them, runs into and collects on the hearth or solid bottom $g$, which lies below the level of these raised platforms or surfaces.

In some cases, all the fused salt will be retained on the hearth $g$; but if desired, it may be partly or wholly run from same, as it reaches it, through the tap hole $m$; or, to a sunk well or receiver.

A large proportion of the earthy matters when rock salt is being melted, which it contains, will be retained upon the platforms $f$, which can be removed by scraping it off by rakes introduced through the doorways and doors $l$, through which also access to the bottom $g$ is had, for cleaning.

The platform $f$ may be provided with raised edge parts $j$, as shown in Fig. 5, at suitable intervals, to prevent the earthy matters from being carried off with the salt.

A modified means of separating the earthy impurities from the liquid salt within the furnace, is illustrated in Fig. 6, in which the floor $g$ is inclined downward away from the tap hole $m$, so that the residue gravitates down the bottom $g$ toward the lowest point, and is run off—after tapping of the molten salt through the tap hole $m$—through a separate tap hole $n$ in the side wall of the furnace; and a sump $o$ or sumps $o$, is or are provided in this lower part, in which the heavy earthy residue or impurities will collect. Or, the hearth may be inclined, as shown in Fig. 6ᴬ, and after tapping the molten salt, the residue may be removed from the sumps through tap holes $n$ below $m$.

If it should be desired for special reasons, to melt the salt on the platform or surface at an even depth, it will have to be distributed by rakes, or the like, through the doorways $l$.

In Figs. 7 and 8, the salt is supplied on to a plurality of interspaced trays $f$, with spaces between them, so that the salt is in the form of a plurality of hollow conical piles, upon the exterior of which the melting gases at their initial or maximum temperature, first act, and do most of the melting; while a very substantial additional melting is also effected by the gases having access to the interior of the piles, by way of the spaces between the trays or shelves $f$, and without having to pass through the body of salt. The melted salt from the outside, flows down over the piles into the hearth or bottom $g$, beneath the trays $f$, through the openings $h$, while that melted on the inside, flows down through the openings $p$ in the table $f$, onto the hearth.

Where only one set of trays is employed, or where a number of sets are used, and separated by division walls, instead of these being arranged as shown in Figs. 7 and 8, they may be arranged so that the upper ones start from the walls, and the lowermost one in the center; all being spaced apart as regards the horizontal position, similarly as in Figs. 7 and 8. Of course there may be any number of trays according to size of the furnace.

In the modification shown in Figs. 9 and 10, the trays $f$ instead of being continuous, are arranged either in rectangular form, as shown, or in circular form, one of such sets of trays being disposed under each of the supply apertures $e$ in the roof.

What is claimed is:—

1. In apparatus for melting salt and maintaining it in a molten condition, a chamber divided into two compartments, one for melting the salt and the other for receiving the melted salt, and means for heating the two compartments to two different degrees of temperature, the temperature of the receiving compartment being lower than that of the melting compartment.

2. In apparatus for melting salt and maintaining it in a molten condition, a salt melting chamber, means for supplying melting gases to the melting chamber, a receiving chamber for the melted salt, means for separating the two chambers, means for heating the receiving chamber to a temperature below the temperature of the melting chamber and for maintaining the melted salt in a molten condition by heat transmitted through the separating means from the melting gases, and means of communication between the two chambers.

3. In apparatus for melting salt and maintaining it in a molten condition, a salt melting chamber, a receiving chamber for the melted salt, and a division wall between the two chambers having ports connecting the two chambers, and means for supplying hot gases to the melting chamber for melting the unmelted salt, and for heating the chamber receiving the melted salt to a lower degree of temperature than that of the melting chamber, by way of the ports in the division wall.

4. In apparatus for melting salt and maintaining it in a molten condition, a furnace comprising upper and lower chambers, means for feeding unmelted salt to the upper chamber, a device disposed intermediately of the upper and lower chambers for supporting the unmelted salt in heaps as it is fed into the upper chamber, and having orifices of communication between the upper and lower chambers; and means for supplying hot gases to the upper chamber for melting the salt, and for heating the lower chamber by way of the orifices, to a lower degree of temperature than that of the upper chamber, for maintaining the melted salt in a molten condition.

5. In apparatus for melting salt and maintaining it in a molten condition, a furnace comprising upper and lower chambers, a table separating the two chambers and having orifices of communication between the two chambers, means for supplying the unmelted salt at a plurality of points and forming it into heaps on the table in the upper chamber, and means for supplying hot gases to the upper chamber for melting the salt, and for heating the lower chamber by way of the said orifices for maintaining the salt in a molten condition at a lower degree of temperature than that of the upper chamber and below the volatilizing point of salt.

6. In apparatus for melting salt and maintaining it in a molten condition, a furnace comprising an upper chamber, a lower chamber having an inclined floor, a table separating the upper and lower chambers, and having ports of communication between the two chambers, means for feeding and heaping salt on the table, and means for introducing hot gases into the upper chamber for melting the salt and for heating the lower chamber to a lower degree of temperature and less than the volatilizing point of salt, but sufficient to maintain the melted salt in a molten condition.

7. In apparatus for melting salt and maintaining it in a molten condition, a furnace comprising an upper melting chamber, a lower chamber for receiving melted salt having an inclined floor and a sump formed therein, a table disposed intermediately of the upper and lower chambers having holes therein, means for feeding salt on to the table between the holes therein, and means for introducing hot gases into the upper chamber for melting the salt on the table, and for heating the lower chamber by way of the holes in the table.

8. In apparatus for melting salt and maintaining it in a molten condition, a furnace comprising an upper melting chamber, having a roof, means for feeding unmelted salt to the melting chamber through the said roof, a table for receiving the unmelted salt arranged at such a distance below the roof as to leave a combustion space between the roof and the upper surface of the unmelted salt, and having through passages formed therein; means for introducing heating gases into the melting chamber for reducing the unmelted salt to a molten condition; and a lower chamber for receiving the melted salt disposed beneath the said table and communicating with the passages therein, and heated by heat transmitted from the upper chamber through the said passages.

9. A furnace for melting salt and maintaining the melted salt in a molten condition without volatilizing it, comprising side walls fitted with sliding cleaning doors, end walls having ports for the inlet and outlet of melting gases in the upper half of the furnace, a roof having a plurality of valve controlled openings, a sloping floor, an intermediate table supported on arches and having apertures of communication between the upper and lower compartments, and of such an area as to leave a space between the side and ends of the table, respectively, and the side and end walls of the furnace, molten salt tapping ports communicating with the lower chamber, tapping troughs for the salt tapping ports, and ports for tapping the impurities from the bottom chamber.

In testimony whereof I affix my signature in presence of two witnesses.

ERNEST R. ROYSTON.

Witnesses:
SOMERVILLE GOODALL,
FRANK E. FLEETWOOD.

---

Copies of this patent may be obtained for five cents each, by addressing the "Commissioner of Patents, Washington, D. C."